Oct. 18, 1960     C. B. SIEBER     2,956,438
VIBRATOR
Original Filed May 2, 1955
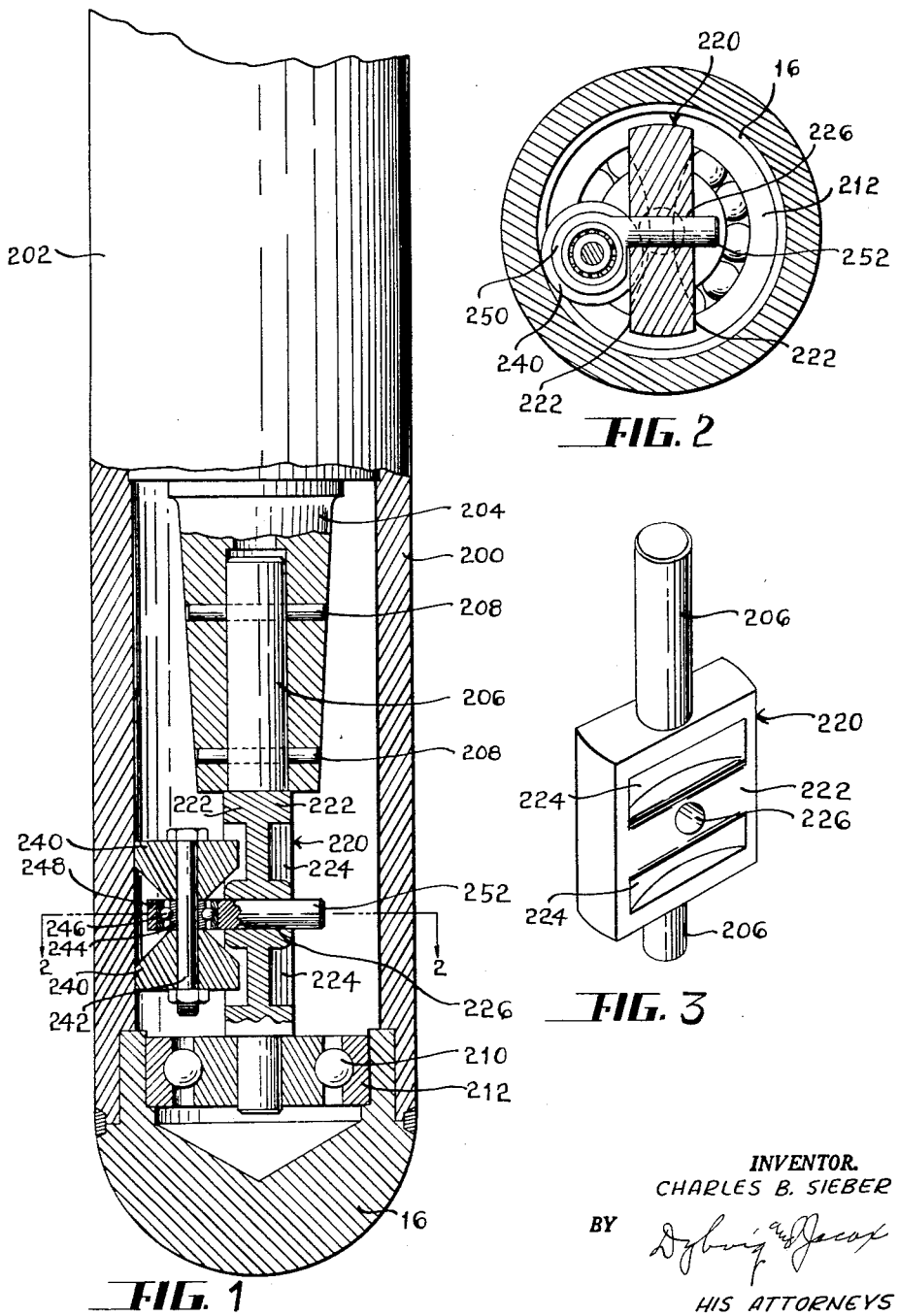
INVENTOR.
CHARLES B. SIEBER
BY
HIS ATTORNEYS United States Patent Office 2,956,438
Patented Oct. 18, 1960

2,956,438
VIBRATOR

Charles B. Sieber, Villa Park, Ill., assignor of one-half to William J. Miller, Glen Ellyn, Ill., and one-half to Elmer R. Stitt, Dayton, Ohio Original application May 2, 1955, Ser. No. 505,308, now Patent No. 2,841,995, dated July 8, 1958. Divided and this application June 23, 1958, Ser. No. 743,717

2 Claims. (Cl. 74—87)

This invention relates to a vibrator and more particularly to a vibrator that may be used in vibrating concrete and other materials where vibrations are used to compact the material, although not necessarily so limited.

This is a divisional application of my copending application for United States Letters Patent Serial No. 505,308, filed May 2, 1955, for Vibrator, now Patent No. 2,841,995, issued July 8, 1958.

In the past, vibrators have been made for vibrating concrete and the like, wherein an eccentric weight mounted upon a rotating body is used to create the unbalanced condition. This eccentric weight may have either one or both ends supported in roller bearings, so that the force, in part at least, is transmitted from the eccentric weight through the bearings to the part that is to be vibrated. It is rather common practice to use a high speed motor, such as a universal motor, for rotating the part. In so doing, the bearings do not stand up for any great length of time. As a matter of fact, the life of a bearing may be on the order of a few hours.

An object of this invention is to provide a vibrator wherein the weight is driven in rotation, the weight exerting its force against the housing of the vibrator without transmitting the forces through the bearings. The mechanism for rotating the weight is preferably balanced, so that practically no unbalanced centrifugal forces act against the bearings. The weight may preferably consist of revolving cylindrical or spherical masses traveling through a circular orbit, the masses being so mounted that they roll on the inside of the cylindrical cavity of the housing. Thus, by causing the masses to travel through the orbit at a very high speed, the centrifugal forces act directly against the wall of the cylindrical cavity.

Another object of this invention is to provide a centrifugal weight that travels through a circular orbit, the weight being mounted upon bearings also traveling through a circular orbit. By this arrangement, bearings are provided for support of the centrifugal weight such that no unbalanced centrifugal forces of any substantial amount are transmitted to or through the bearings.

Other objects and advantages reside in the construction of parts, the combination thereof, the method of manufacture and the mode of operation, as will become more apparent from the following description.

In the drawings,

Figure 1 discloses a longitudinal cross sectional view of a portion of a vibratory device.

Figure 2 is a cross sectional view, taken substantially on the line 2—2 of Figure 1.

Figure 3 is a perspective view of a rotatably mounted support for the eccentric shown in Figure 1.

In the vibrator shown herein, a pair of eccentric roller weights are rotatably mounted upon a bearing or bearings traveling through a circular orbit, the roller weights with the bearings being permitted to move outwardly in response to centrifugal force, so that the roller weights will engage the interior of the cylindrical cavity of the housing surrounding the rollers. The mechanism for rotating the rollers is mounted in bearings that are not influenced to any great extent by the centrifugal force exerted by the rotating eccentric roller weight, since the centrifugal force exerted against the wall of the housing is not transmitted through the bearings to the housing, but is transmitted directly to the housing by means of the roller weights mounted for rotation in rolling engagement with the interior of the housing. These weights, rotating about their own axes, are driven by means of a concentrically disposed member that rotates and drives the roller weights and the parts associated therewith through a circular path, said driving means being rotatable about an axis concentric with the circular path.

In the drawings, Figure 1 discloses a cylindrical shell or housing 200 that may have a driving force mounted in the solid portion 202 which is drivingly connected to a mechanism for imparting centrifugal forces to the inner cylindrical wall of member 200, which will now be described.

The driving force drives a frustum-conical hollow shaft 204, that has mounted therein a stub-shaft 206. One end of the shaft-like member 206 projects into a tubular recess or aperture in the frustum-conical member 204 and is keyed thereto by means of a pair of keys or pins 208. The lower end of the shaft 206 is mounted in bearings 210, the outer race 212 being positioned in a rabbet in the plug 16.

The shaft 206 has been turned out of a piece of metal and provided with a segment 220 of a cylinder. This segment has a pair of oppositely disposed facets 222 that are parallel to each other. The general contour of member 220 is substantially rectangular having arcuate edges, said edges occupying a surface of revolution having a rotational axis coincident with the longitudinal generatrix axis of the cylinder, the generatrix axis coinciding with the axis of rotation of member 220, member 220 being symmetrical with respect to the axis of rotation. The facets 222 have been provided with a pair of arcuate trough-like recesses 224. An aperture 226 extends transversely through the center of the cylindrical sector 220, which serves as a journal block.

The eccentric used in transmitting centrifugal force to the inner wall of member 200 includes a pair of rollers 240 mounted upon a suitable transverse bolt or pin 242 supported in the inner race 244 of a roller bearing 246 having the outer race 248 mounted in a ring 250 integral with a cylindrical pin 252 extending through the aperture 226. The pin 252 is offset, so that the rollers 240 and the supporting structure function in a manner similar to a caster. The rollers 240 project into the trough-like recesses 224. This is to provide sufficient clearance so as to concentrate a considerable amount of weight eccentrically mounted.

As the driving force drives the frustum-conical member 204 and the shaft 206 in a clockwise direction, as viewed in Figure 2, the rollers 240 will be thrust outwardly by centrifugal force, so as to exert a pressure against the inner cylindrical cavity or wall of the cylindrical housing 200. Due to the fact that the rollers are symmetrically mounted, with respect to the bolts or pins 242, no centrifugal force will be transmitted directly to the bearing 246. Likewise, the centrifugal force exerted by the rollers 240 will not influence the bearings 210 in which the shaft 206 is mounted.

Although the vibrator described herein discloses a motor, the vibrator could be driven in any other suitable manner, either directly or indirectly, from any suitable source of power, such as electric motor, pneumatic or hydraulic motor, internal combustion engine, steam engine or any other source of energy.

In the device disclosed herein, the entire concentric weight, shaft and bearing assembly may be inserted and removed from the driving force end of the cylindrical sleeve.

Due to the fact that the center of gravity of the eccentric mass is further removed from the axis of rotation than the eccentric mass of vibrators now on the market, the effectiveness of the arrangement of the disclosure herein is far greater than those now in use.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a vibrator for use in imparting vibratory movements, said vibrator comprising a housing having an inner wall defining a cylindrical cavity, rotary means supported in said cavity for rotation about an axis concentric thereto, means to rotate said rotary means, said rotary means including a journal block provided with a cylindrical aperture passing radially through said axis of rotation, said rotary means with said journal block being balanced for vibration-free rotation in said cavity, a first shaft journalled for free rotary and axial movement in said aperture, said shaft terminating at one end in an annular portion, a roller bearing mounted within said annular portion, a second shaft supported by said roller bearing for rotation about an axis transverse to said first shaft, and a pair of roller elements journalled on said second shaft adapted to roll on the inner wall of said housing upon rotation of said rotary means, said roller elements being disposed in balanced positions on opposite sides of said first shaft, the improvement wherein the axis of rotation of said roller elements as defined by said roller bearing is displaced from the axis of rotation of said first shaft as defined by the aperture in said journal block such that said axes do not intersect.

2. In a vibrator for use in imparting vibratory movements, said vibrator comprising a housing having an inner wall defining a cylindrical cavity, rotary means supported in said cavity for rotation about an axis concentric thereto, driving means to rotate said rotary means, said rotary means including a journal block provided with a cylindrical aperture passing radially through said axis of rotation, said rotary means with said journal block being balanced for vibration-free rotation in said cavity, a shaft journalled for free rotary and axial movement in said aperture, and roller means supported by one end of said shaft for rotation about an axis transverse thereto, said roller means engaging the inner wall of said housing for rolling movement thereon upon rotation of said rotary means, the improvement wherein the rotational axis of said roller means is displaced from the axis of said shaft so as not to intersect therewith.

References Cited in the file of this patent

UNITED STATES PATENTS

| | | |
|---|---|---|
| 1,719,122 | Mitchell | July 2, 1929 |
| 1,733,373 | Jubien | Oct. 29, 1929 |
| 2,127,317 | Welch | Aug. 16, 1938 |
| 2,829,529 | Fleming | Apr. 8, 1958 |
| 2,831,353 | Ongaro | Apr. 22, 1958 |
| 2,841,995 | Sieber | July 8, 1958 |

FOREIGN PATENTS

| | | |
|---|---|---|
| 64,467 | France | June 8, 1955 |
| | (First addition to 1,063,465) | |
| 933,483 | France | Jan. 1, 1948 |